(12) United States Patent
Utsunomiya et al.

(10) Patent No.: US 12,386,213 B2
(45) Date of Patent: Aug. 12, 2025

(54) OPTICAL MODULATOR AND METHOD FOR DRIVING OPTICAL MODULATION ELEMENT

(71) Applicant: TDK CORPORATION, Tokyo (JP)

(72) Inventors: Hajime Utsunomiya, Tokyo (JP); Takashi Kikukawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 226 days.

(21) Appl. No.: 17/924,533

(22) PCT Filed: Jul. 13, 2021

(86) PCT No.: PCT/JP2021/026211
§ 371 (c)(1),
(2) Date: Nov. 10, 2022

(87) PCT Pub. No.: WO2022/034766
PCT Pub. Date: Feb. 17, 2022

(65) Prior Publication Data
US 2023/0229030 A1 Jul. 20, 2023

(30) Foreign Application Priority Data
Aug. 11, 2020 (JP) .................... 2020-135860

(51) Int. Cl.
*G02F 1/035* (2006.01)
*G02F 1/21* (2006.01)
*G02F 1/225* (2006.01)

(52) U.S. Cl.
CPC .............. *G02F 1/035* (2013.01); *G02F 1/212* (2021.01); *G02F 1/225* (2013.01); *G02F 2202/20* (2013.01)

(58) Field of Classification Search
CPC .......... G02F 1/035; G02F 1/212; G02F 1/225; G02F 2202/20
(Continued)

(56) References Cited

U.S. PATENT DOCUMENTS 6,334,004 B1  12/2001  Ohkuma et al.
2004/0061922 A1  4/2004  Mauro et al.
(Continued)

FOREIGN PATENT DOCUMENTS

JP  2000-180804 A  6/2000
JP  2004-037695 A  2/2004
(Continued)

OTHER PUBLICATIONS

Sep. 14, 2021 Search Report issued in International Patent Application No. PCT/JP2021/026211.
(Continued)

*Primary Examiner* — Jerry M Blevins
(74) *Attorney, Agent, or Firm* — Oliff PLC

(57) ABSTRACT

This optical modulator includes an optical modulation element having a first optical waveguide, a second optical waveguide, a first electrode configured to apply an electric field to the first optical waveguide, and a second electrode configured to apply an electric field to the second optical waveguide; and a control unit configured to control an applied voltage between the first electrode and the second electrode. The control unit sets Vpp to $0.06 \times V\pi \leq Vpp \leq 0.4 \times V\pi$ when a half-wavelength voltage of the optical modulation element is $V\pi$ and an applied voltage width that is an amplitude of an applied voltage applied to the optical modulation element is Vpp, and sets $Vn \leq Vmin \leq Vn+0.29 \times V\pi$ or $Vn-0.29 \times V\pi \leq Vmax \leq Vn$ when a minimum value and a maximum value of a voltage applied to the optical modulation element are respectively Vmin and Vmax and a null point voltage of the optical modulation element is Vn.

4 Claims, 5 Drawing Sheets

(58) Field of Classification Search
USPC ............................................................ 385/2
See application file for complete search history.

(56) References Cited

U.S. PATENT DOCUMENTS

| | | |
|---|---|---|
| 2015/0138619 A1 | 5/2015 | Iwatsuka et al. |
| 2023/0176403 A1* | 6/2023 | Utsunomiya ........... G02F 1/035 |
| | | 385/2 |
| 2023/0213791 A1* | 7/2023 | Utsunomiya ......... G02F 1/2255 |
| | | 385/2 |

FOREIGN PATENT DOCUMENTS

| | | |
|---|---|---|
| JP | 4164179 B2 | 10/2008 |
| JP | 2019-045880 A | 3/2019 |

OTHER PUBLICATIONS

Translation of Dec. 6, 2022 Office Action issued in Japanese Patent Application No. 2020-135860.

* cited by examiner

OPTICAL MODULATOR AND METHOD FOR DRIVING OPTICAL MODULATION ELEMENT

TECHNICAL FIELD

The present invention relates to an optical modulator and a method for driving an optical modulation element. This application claims the benefit of priority from Japanese Patent Application No. 2020-135860, filed on Aug. 11, 2020, the content of which is incorporated herein.

BACKGROUND ART

The volume of communication has increased drastically with the spread of the Internet, and the importance of optical fiber communication has risen significantly. Optical fiber communication, in which an electrical signal is converted into an optical signal and the optical signal is transmitted through an optical fiber, is characterized by a wide band, a low loss, and resistance to noise.

Optical modulators convert an electrical signal into an optical signal. For example, Patent Document 1 and Patent Document 2 disclose Mach-Zehnder-type optical modulators in which optical waveguides are formed by Ti (titanium) diffusion near a surface of a lithium niobate single crystal substrate. In addition, Patent Document 2 discloses that an operating point drift of the optical modulator is corrected. The optical modulators disclosed in Patent Document 1 and Patent Document 2 operate at a high speed such as 40 Gb/s or faster but have a long overall length such as around 10 cm.

In contrast, Patent Document 3 discloses a Mach-Zehnder-type optical modulator using a c-axis-oriented lithium niobate film. Compared to an optical modulator using a lithium niobate single crystal substrate, an optical modulator using a lithium niobate film has a small size and uses a low drive voltage.

CITATION LIST

Patent Document

[Patent Document 1]
Japanese Unexamined Patent Application, First Publication No. 2004-37695
[Patent Document 2]
Japanese Patent No. 4164179
[Patent Document 3]
Japanese Unexamined Patent Application, First Publication No. 2019-45880

SUMMARY OF INVENTION

Technical Problem

Since optical modulators using lithium niobate have a large extinction ratio and can be operated in a high-frequency band, they are used for long-distance communication such as inter-city communication. In addition, since optical modulators using indium phosphide can also be operated in a high-frequency band, they are expected to be used for long-distance communication. Meanwhile, in recent years, there has also been increase in short/intermediate-range communication within a data center or between data centers, and a large extinction ratio is not required for such application. Therefore, there are cases in which optical modulators using silicon are used or there are cases in which emitted light is directly modulated by a laser diode drive circuit without using an optical modulator. In optical modulators using silicon, miniaturization and low-voltage driving, specifically 5 mm or shorter and 2.4 V or lower are realized, but they cannot cope with operation in a high-frequency band.

Meanwhile, miniaturization and low-voltage driving are required in order to apply optical modulators which can be operated in a high-frequency band, such as optical modulators using lithium niobate or optical modulators using indium phosphide, to communication within a data center or between data centers. Regarding optical modulators using a lithium niobate film, although a drive voltage can be reduced compared to an optical modulator in which an optical waveguide is formed near a surface of a lithium niobate single crystal substrate by Ti diffusion, there is a need to further reduce the drive voltage in order to substitute for an optical modulator using silicon. In ordinary Mach-Zehnder-type optical modulators, this drive voltage corresponds to a half-wavelength voltage (half-wavelength phase modulation voltage) that is a voltage for setting a phase difference of light to 180°, and a voltage value thereof increases in accordance with miniaturization of the optical modulator. Specifically, in Reference 3 as well, when an interaction length is set to 5 mm, $V\pi$ becomes 4.8 V, and it cannot be used as the optical modulator for a data center described above. There is a need to set the drive voltage to be equal to or less than 50% of $V\pi$, practically equal to or less than 40%, preferably equal to or less than 35%, and more preferably equal to or less than 30%. Therefore, in order to cope with both miniaturization and low-voltage driving of an optical modulator, there is a need to perform operation at a drive voltage lower than the half-wavelength voltage $V\pi$ (0.4 $V\pi$ or lower). In addition, an extinction ratio is also required to be set to 3 dB or larger.

The present invention has been made in consideration of the foregoing problems, and an object thereof is to provide an optical modulator capable of obtaining an extinction ratio of 3 dB or larger when being operated at a drive voltage lower than a half-wavelength voltage, and a driving method in which an optical modulation element is driven at a drive voltage lower than a half-wavelength voltage while an extinction ratio of 3 dB or larger is secured.

Solution to Problem (1) An optical modulator according to a first aspect includes an optical modulation element having a first optical waveguide, a second optical waveguide, a first electrode configured to apply an electric field to the first optical waveguide, and a second electrode configured to apply an electric field to the second optical waveguide; and a control unit configured to control an applied voltage between the first electrode and the second electrode. The control unit sets Vpp to $0.06 \times V\pi \leq Vpp \leq 0.4 \times V\pi$ when a half-wavelength voltage of the optical modulation element is $V\pi$ and an applied voltage width that is an amplitude of an applied voltage applied to the optical modulation element is Vpp, and sets $Vn \leq Vmin \leq Vn + 0.29 \times V\pi$ or $Vn - 0.29 \times V\pi \leq Vmax \leq Vn$ when a minimum value and a maximum value of a voltage applied to the optical modulation element are respectively Vmin and Vmax and a null point voltage of the optical modulation element is Vn.

(2) In the optical modulator according to the foregoing aspect, the first optical waveguide and the second optical waveguide each may include a ridge-shaped portion protruding from a first surface of a lithium niobate film.

(3) A method for driving an optical modulation element according to a second aspect is a method for driving an optical modulation element having a first optical waveguide, a second optical waveguide, a first electrode at a position overlapping the first optical waveguide in a plan view, and a second electrode at a position overlapping the second optical waveguide in a plan view. Vpp is set to $0.06 \times V\pi \leq Vpp \leq 0.4 \times V\pi$ when a half-wavelength voltage of the optical modulation element is $V\pi$ and an applied voltage width that is an amplitude of an applied voltage applied to the optical modulation element is Vpp, and $Vn \leq Vmin \leq Vn+0.29 \times V\pi$ or $Vn-0.29 \times V\pi \leq Vmax \leq Vn$ is set when a minimum value and a maximum value of a voltage applied to the optical modulation element are respectively Vmin and Vmax and a null point voltage of the optical modulation element is Vn.

(4) In the method for driving an optical modulation element according to the foregoing aspect, the first optical waveguide and the second optical waveguide each may include a ridge-shaped portion protruding from a first surface of a lithium niobate film.

Advantageous Effects of Invention

In the optical modulator and the method for driving an optical modulation element according to the foregoing aspect, it is possible to perform operation at a drive voltage lower than a half-wavelength voltage and to obtain an extinction ratio of 3 dB or larger.

DESCRIPTION OF EMBODIMENT

Figure 1:
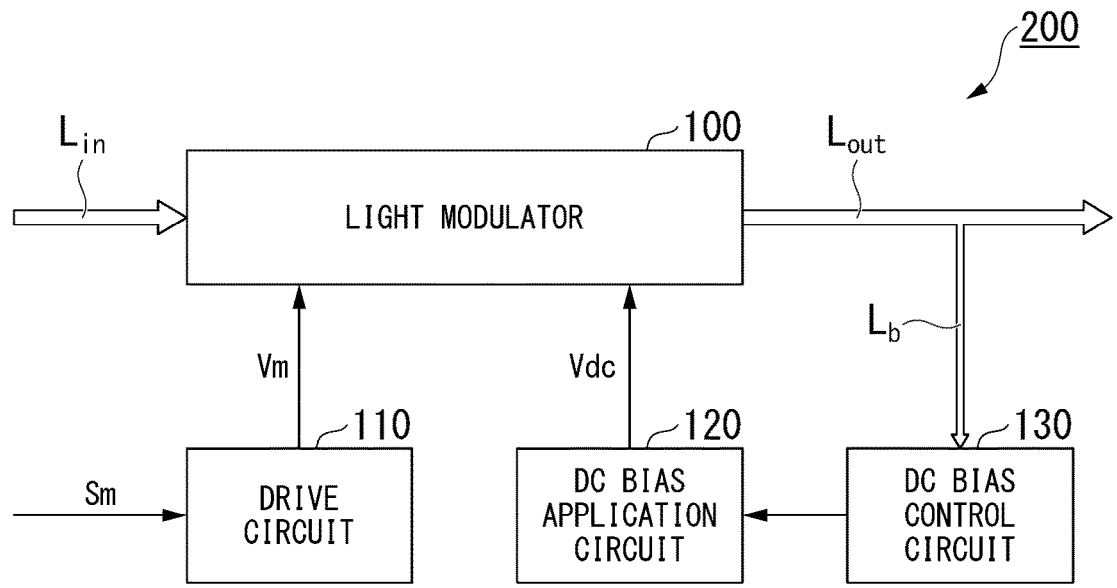
FIG. 1 is a block diagram of an optical modulator according to a first embodiment.

Hereinafter, the present embodiment will be described in detail suitably with reference to the drawings. In the drawings used in the following description, in order to make characteristics easy to understand, characteristic parts may be illustrated in an enlarged manner for the sake of convenience, and dimensional ratios or the like of each constituent element may differ from actual values thereof. Materials, dimensions, and the like exemplified in the following description are examples. The present invention is not limited thereto and can be suitably changed and performed within a range exhibiting the effects of the present invention.

First, directions will be defined. One direction on one surface of a substrate Sb will be referred to as an x direction, and a direction orthogonal to the x direction will be referred to as a y direction. For example, the x direction is a direction in which a first optical waveguide 11 extends. A z direction is a direction perpendicular to the substrate Sb. The z direction is a direction orthogonal to the x direction and the y direction. Hereinafter, the positive z direction may be expressed as "upward", and the negative z direction may be expressed as "downward". The upward and downward directions do not necessarily coincide with the direction in which the force of gravity acts.

FIG. 1 is a block diagram of an optical modulator 200 according to a first embodiment. The optical modulator 200 has an optical modulation element 100, a drive circuit 110, a DC bias application circuit 120, and a DC bias control circuit 130. A control unit of the optical modulator 200 has the drive circuit 110, the DC bias application circuit 120, and the DC bias control circuit 130.

The optical modulation element 100 converts an electrical signal into an optical signal. The optical modulation element 100 converts input light $L_{in}$, which has been input thereto, into output light $L_{out}$ in accordance with a modulation signal Sm.

The drive circuit 110 applies a modulation voltage Vm corresponding to the modulation signal Sm to the optical modulation element 100. An applied voltage width of a modulation signal at this time will be regarded as Vpp. The DC bias application circuit 120 applies a DC bias voltage Vdc to the optical modulation element 100. The DC bias control circuit 130 monitors the output light $L_{out}$ and controls the DC bias voltage Vdc output from the DC bias application circuit 120. An operating point Vd (which will be described below) is controlled by adjusting this DC bias voltage Vdc.

Figure 2:
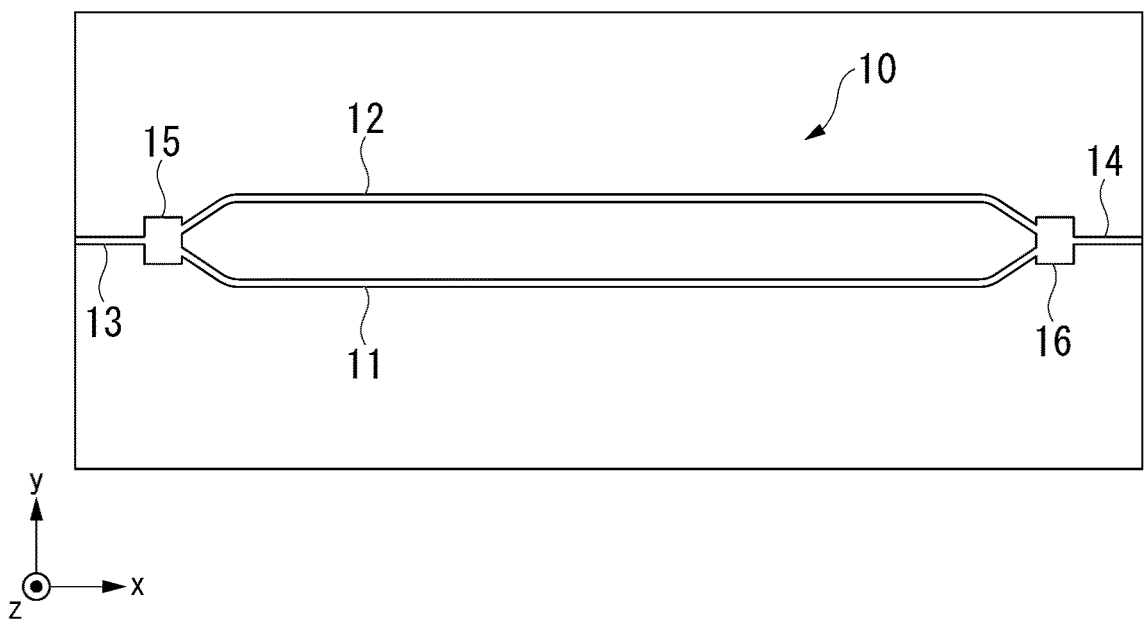
FIG. 2 is a plan view of an optical waveguide according to the first embodiment.
Figure 3:
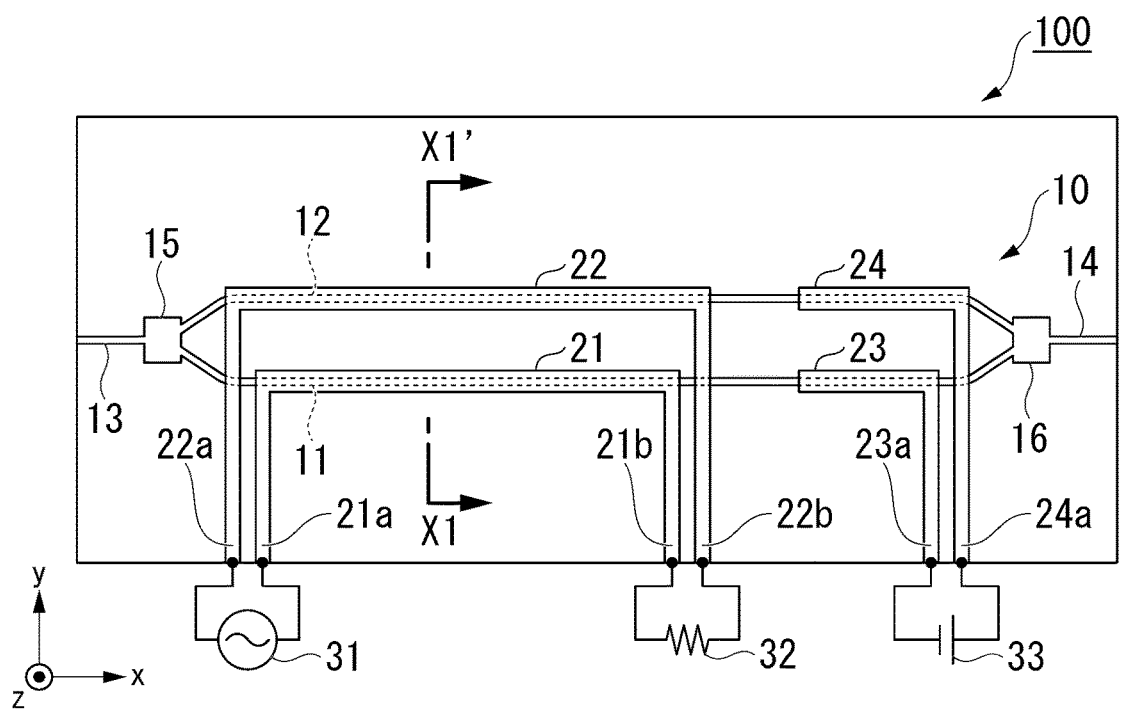
FIG. 3 is a plan view of an optical modulation element according to the first embodiment.
Figure 4:
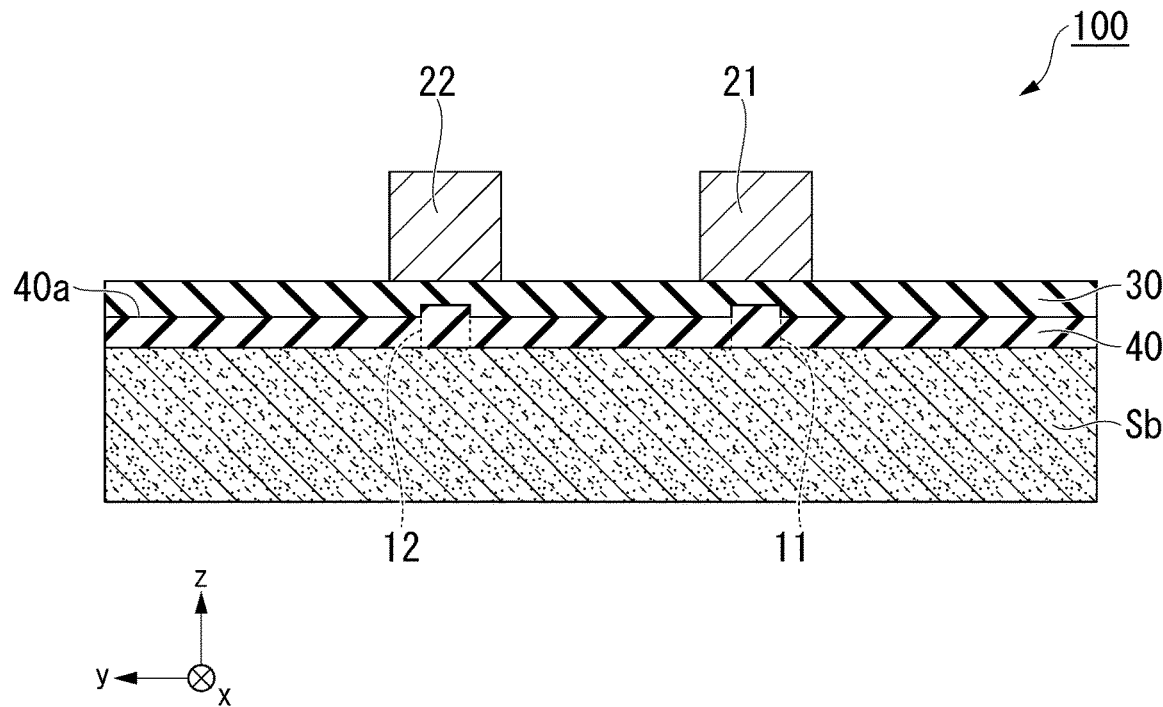
FIG. 4 is a cross-sectional view of the optical modulation element according to the first embodiment.

FIG. 2 is a plan view of an optical waveguide 10 of the optical modulation element 100 viewed in the z direction. FIG. 3 is a plan view of the optical modulation element 100 viewed in the z direction. FIG. 4 is a cross section cut along X1-X1' in FIG. 3. The optical modulation element 100 has the optical waveguide 10 and electrodes 21, 22, 23, and 24.

The optical modulation element 100 is located on the substrate Sb. The substrate Sb need only be a substrate on which an oxide film 40 such as a lithium niobate film can be formed as an epitaxial film, and it is preferably a sapphire single crystal substrate or a silicon single crystal substrate. A crystal orientation of the substrate Sb is not particularly limited. The lithium niobate film has properties of being easily formed as a c-axis-oriented epitaxial film with respect to the substrate Sb having various crystal orientations. Since a crystal constituting a c-axis-oriented lithium niobate film has three-fold symmetry, it is desired that the substrate Sb (base material) also have the same symmetry. In the case of a sapphire single crystal substrate, a substrate of a c-plane is preferable, and in the case of a silicon single crystal substrate, a substrate of a (111) plane is preferable.

The optical waveguide 10 is a light passage in which light is propagated. For example, the optical waveguide 10 has the first optical waveguide 11, a second optical waveguide 12, an input path 13, an output path 14, a branch portion 15, and a coupling portion 16. For example, the first optical waveguide 11 and the second optical waveguide 12 extend in the x direction. The first optical waveguide 11 and the second optical waveguide 12 have substantially the same length in the x direction. The branch portion 15 is located between the input path 13, and the first optical waveguide 11 and the second optical waveguide 12. The input path 13 leads to the first optical waveguide 11 and the second optical waveguide 12 with the branch portion 15 therebetween. The coupling portion 16 is located between the first optical waveguide 11 and the second optical waveguide 12, and the output path 14. The first optical waveguide 11 and the second optical waveguide 12 lead to the output path 14 with the coupling portion 16 therebetween.

The optical waveguide 10 includes the first optical waveguide 11 and the second optical waveguide 12 which are ridge-shaped portions protruding from a first surface 40a of the oxide film 40. The first surface 40a is an upper surface in a part other than the ridge-shaped portions of the oxide film 40. The ridge-shaped portions protrude in the z direction from the first surface 40a and extend along the optical waveguide 10. The shape of an X1-X1' cross section (a cross section perpendicular to a traveling direction of light) of each ridge-shaped portion may be any shape as long as it is a shape capable of guiding light, and it may be a dome shape, a triangular shape, or a rectangular shape, for example. The width of each ridge-shaped portion in the y direction is 0.3 μm to 5.0 μm, for example, and the height of each ridge-shaped portion (protrusion height from the first surface 40a) is 0.1 μm to 1.0 μm, for example. The ridge-shaped portions are constituted of the same material as the oxide film 40.

For example, the oxide film 40 is a c-axis-oriented lithium niobate film. For example, the oxide film 40 is an epitaxial film epitaxially grown on the substrate Sb. An epitaxial film indicates a single crystal film of which the crystal orientation is aligned by the substrate (base material). An epitaxial film is a film which has a single crystal orientation in the z direction and an in-plane (xy) direction and in which crystals are oriented in a manner of being aligned together in an x axis direction, a y axis direction, and a z axis direction. For example, it is possible to verify whether or not there is an epitaxial film by checking a peak intensity and a pole at an orientation position in 2θ-θ X-ray diffraction. In addition, the oxide film 40 may be a lithium niobate film provided on a Si substrate with SiO$_2$ therebetween.

Specifically, when measurement is performed by 2θ-θ X-ray diffraction, all peak intensities other than that on a target surface are equal to or less than 10% and preferably equal to or less than 5% of the maximum peak intensity of the target surface. For example, when the oxide film 40 is a c-axis-oriented epitaxial film, the peak intensity other than that in a (00L) plane is equal to or less than 10% and preferably equal to or less than 5% of the maximum peak intensity of the (00L) plane. Here, (00L) is generic expression of equivalent planes such as (001) and (002).

In addition, conditions for checking the peak intensity at the orientation position described above simply indicate orientations in one direction. Thus, even if the condition described above is obtained, when the crystal orientations are not aligned within a plane, the X-ray intensity at a particular angular position does not increase and no pole is seen. For example, when the oxide film is a lithium niobate film, since LiNbO$_3$ has a crystal structure of a trigonal system, there are three poles of LiNbO$_3$ (014) in a single crystal. In the case of lithium niobate, it is known to epitaxially grow in a so-called twin crystal state in which crystals rotated about the c axis by 180° are symmetrically coupled. In this case, since two of three poles are in a symmetrically coupled state, there are six poles. In addition, when a lithium niobate film is formed on a silicon single crystal substrate of a (100) plane, since a substrate has four-fold symmetry, 12 poles (4×3) are observed. In the present disclosure, an epitaxial film also includes a lithium niobate film which has epitaxially grown in a twin crystal state.

The composition of lithium niobate is Li$_x$NbA$_y$O$_z$. A is an element other than Li, Nb, and O. The subscript x is 0.5 or more and 1.2 or less and preferably 0.9 or more and 1.05 or less. The subscript y is 0 or more and 0.5 or less. The subscript z is 1.5 or more and 4.0 or less and preferably 2.5 or more and 3.5 or less. Examples of the element of A include K, Na, Rb, Cs, Be, Mg, Ca, Sr, Ba, Ti, Zr, Hf, V, Cr, Mo, W, Fe, Co, Ni, Zn, Sc, and Ce, and two or more kinds of these elements may be combined.

The film thickness of the oxide film 40 is 2 μm or smaller, for example. The film thickness of the oxide film 40 is a film thickness of a part other than the ridge-shaped portions. If the film thickness of the oxide film 40 is large, there is concern that crystallinity may deteriorate. In addition, the film thickness of the oxide film 40 is approximately ⅒ or larger than the wavelength of light used, for example. If the film thickness of the oxide film 40 is small, confinement of light becomes weak, and light leaks to the substrate Sb or a buffer layer 30. If the film thickness of the oxide film 40 is small, even if an electric field is applied to the oxide film 40, there is concern that change in effective refractive index of the optical waveguide 10 may decrease.

The electrodes 21 and 22 are electrodes for applying the modulation voltage Vm to the optical waveguide 10. The electrode 21 is an example of a first electrode, and the electrode 22 is an example of a second electrode. A first end 21a of the electrode 21 is connected to a power supply 31, and a second end 21b is connected to a terminal resistor 32. A first end 22a of the electrode 22 is connected to the power supply 31, and a second end 22b is connected to the terminal resistor 32. The power supply 31 is a part of the drive circuit 110 for applying the modulation voltage Vm to the optical modulation element 100.

The electrodes 23 and 24 are electrodes for applying a DC bias Vdc to the optical waveguide 10. A first end 23a of the electrode 23 and a first end 24a of the power supply 24 are connected to a power supply 33. The power supply 33 is a part of the DC bias application circuit 120 for applying the DC bias voltage Vdc to the optical modulation element 100.

In FIG. 3, line widths and line spacings of the electrode 21 and the electrode 22 disposed in a parallel manner are made wider than actual measurements for better visibility. For this reason, although the length of a part in which the electrode 21 and the first optical waveguide 11 overlap (interaction length) and the length of a part in which the electrode 22 and the second optical waveguide 12 overlap (interaction length) appear different, the lengths (interaction lengths) thereof are substantially the same. Similarly, the length of a part in which the electrode 23 and the first optical waveguide 11 overlap (interaction length) and the length of a part in which the electrode 24 and the second optical waveguide 12 overlap (interaction length) are substantially the same.

In addition, when the DC bias voltage Vdc overlaps the electrodes 21 and 22, the electrodes 23 and 24 may not be provided. In addition, ground electrodes may be provided around the electrodes 21, 22, 23, and 24.

The electrodes 21, 22, 23, and 24 are located on the oxide film 40 with the buffer layer 30 sandwiched therebetween. Each of the electrodes 21 and 23 can apply an electric field to the first optical waveguide 11. Each of the electrodes 21 and 23 is located at a position overlapping the first optical waveguide 11 in a plan view in the z direction, for example. Each of the electrode 21 is located above the first optical waveguide 11. Each of the electrodes 22 and 24 can apply an electric field to the second optical waveguide 12. Each of the electrodes 22 and 24 is located at a position overlapping the second optical waveguide 12 in a plan view in the z direction, for example. The electrodes 22 and 24 are located above the second optical waveguide 12.

The buffer layer 30 is located between the optical waveguide 10 and the electrodes 21, 22, 23, and 24. The buffer layer 30 covers and protects the ridge-shaped portions. In addition, the buffer layer 30 prevents light propagated through the optical waveguide 10 from being absorbed into the electrodes 21, 22, 23, and 24. The buffer layer 30 has a lower refractive index than the oxide film 40. Examples of the buffer layer 30 include $SiO_2$, $Al_2O_3$, $MgF_2$, $La_2O_3$, ZnO, $HfO_2$, MgO, $Y_2O_3$, $CaF_2$, and $In_2O_3$, or a mixture of these.

The optical modulation element 100 can be produced by a known method. For example, the optical modulation element 100 is manufactured using a semiconductor process such as epitaxial growth, photolithography, etching, vapor phase growth, or metallization.

The optical modulation element 100 converts an electrical signal into an optical signal. The optical modulation element 100 modulates the input light $L_{in}$ to the output light $L_{out}$. First, modulation operation of the optical modulation element 100 will be described.

The input light $L_{in}$ input from the input path 13 branches into the first optical waveguide 11 and the second optical waveguide 12 and is propagated. The phase difference between light propagated through the first optical waveguide 11 and light propagated through the second optical waveguide 12 is zero at the point of time it branches.

Next, an applied voltage is applied to a part between the electrode 21 and the electrode 22. For example, differential signals having the same absolute values, polarities opposite to each other, and phases not deviating from each other may be respectively applied to the electrode 21 and the electrode 22. The refractive indices of the first optical waveguide 11 and the second optical waveguide 12 change due to an electro-optic effect. For example, the refractive index of the first optical waveguide 11 changes by $+\Delta n$ from a reference refractive index n, and the refractive index of the second optical waveguide 12 changes by $-\Delta n$ from the reference refractive index n.

The difference between the refractive indices of the first optical waveguide 11 and the second optical waveguide 12 creates a phase difference between light propagated through the first optical waveguide 11 and light propagated through the second optical waveguide 12. Rays of light propagated through the first optical waveguide 11 and the second optical waveguide 12 join together in the output path 14 and are output as the output light $L_{out}$. The output light $L_{out}$ is superimposed light of light propagated through the first optical waveguide 11 and light propagated through the second optical waveguide 12. The intensity of the output light $L_{out}$ changes in accordance with the phase difference between light propagated through the first optical waveguide 11 and light propagated through the second optical waveguide 12. For example, when the phase difference is an even multiple of $\pi$, rays of the light are mutually intensified, and when the phase difference is an odd multiple of $\pi$, rays of the light are mutually weakened. In such a procedure, the optical modulation element 100 modulates the input light $L_{in}$ to the output light $L_{out}$ in accordance with an electrical signal.

The modulation voltage Vm corresponding to a modulation signal is applied to the electrodes 21 and 22 for applying a modulation voltage of the optical modulation element 100. A voltage applied to the electrodes 23 and 24 for applying a DC bias voltage, namely, the DC bias voltage Vdc output from the DC bias application circuit 120 is controlled by the DC bias control circuit 130. The DC bias control circuit 130 adjusts the operating point Vd of the optical modulation element 100 by controlling the DC bias voltage Vdc. The operating point Vd is a voltage at the center of the amplitude of a modulation voltage.

Figure 5:
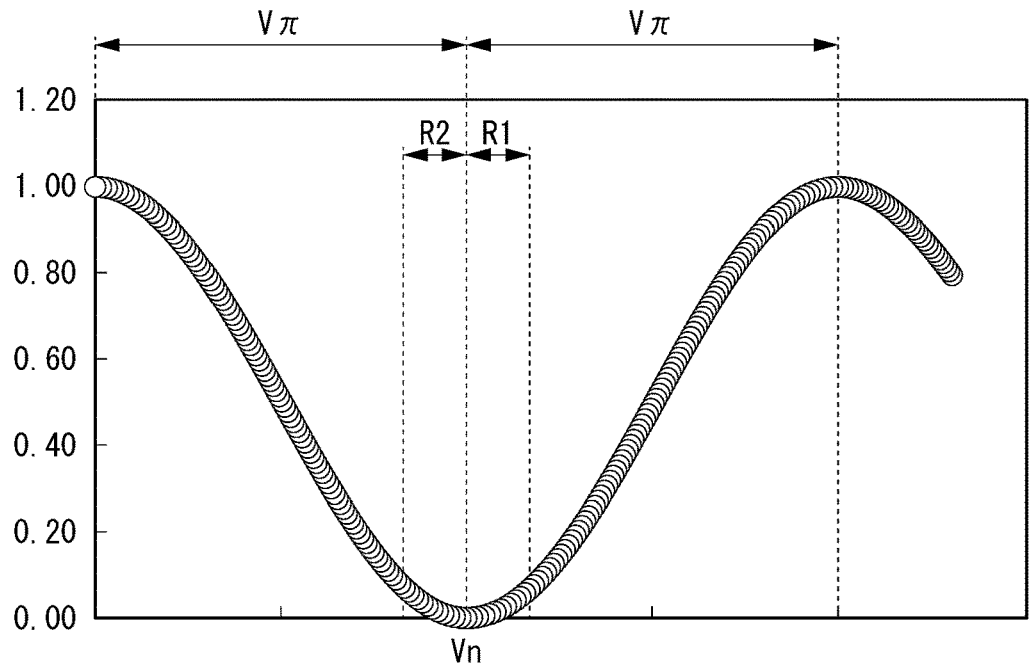
FIG. 5 is a view illustrating a relationship between an applied voltage and an output of the optical modulator according to the first embodiment.

The DC bias control circuit 130 controls an operating point voltage Vd such that a minimum value voltage Vmin of the optical modulation element 100 is within a voltage width R1 as illustrated in FIG. 5 when the minimum value voltage Vmin of an applied voltage is larger than a null point voltage Vn (which will be described below). The operating point voltage Vd is a midpoint between the minimum value voltage Vmin and a maximum value voltage Vmax of an applied voltage. The voltage width R1 is defined by a half-wavelength voltage V$\pi$ and the null point voltage Vn.

Figure 6:
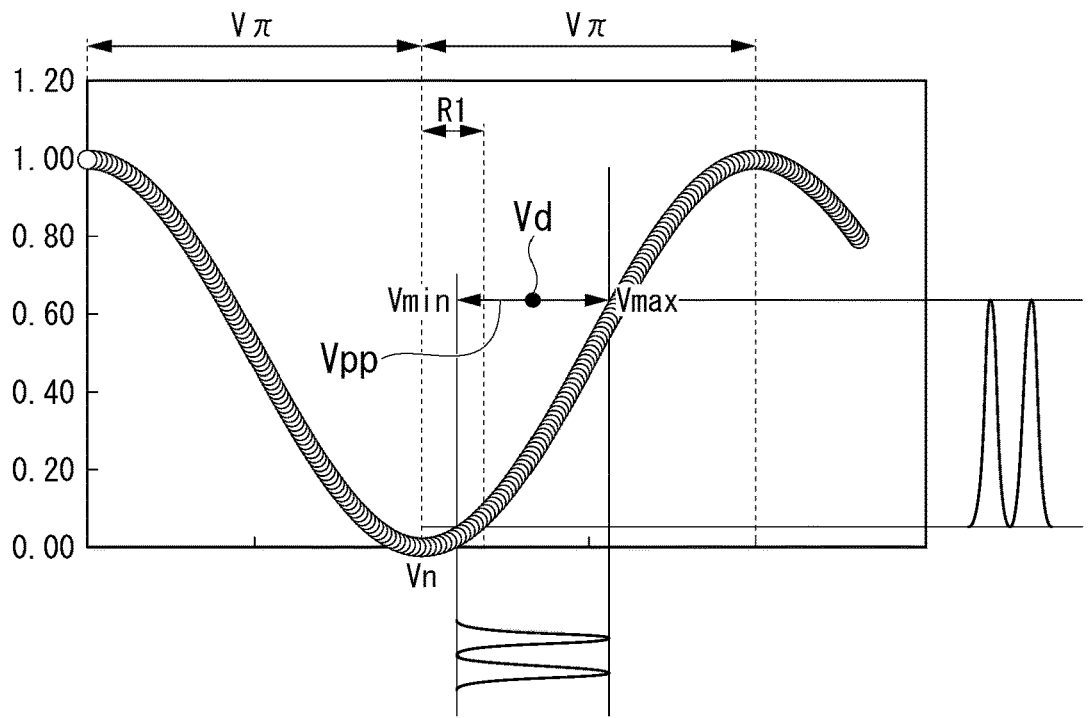
FIG. 6 is an explanatory view of a voltage width R1 of the optical modulator according to the first embodiment.

The voltage width R1 is a range of Vn to Vn+0.291 V$\pi$. When the minimum value voltage Vmin of the applied voltage Vpp is the null point voltage Vn or larger, the minimum value voltage Vmin is designed to satisfy the following Expression (1), as illustrated in FIG. 6.

$$Vn \leq V\min \leq Vn + 0.29 V\pi \qquad (1)$$

Figure 8:
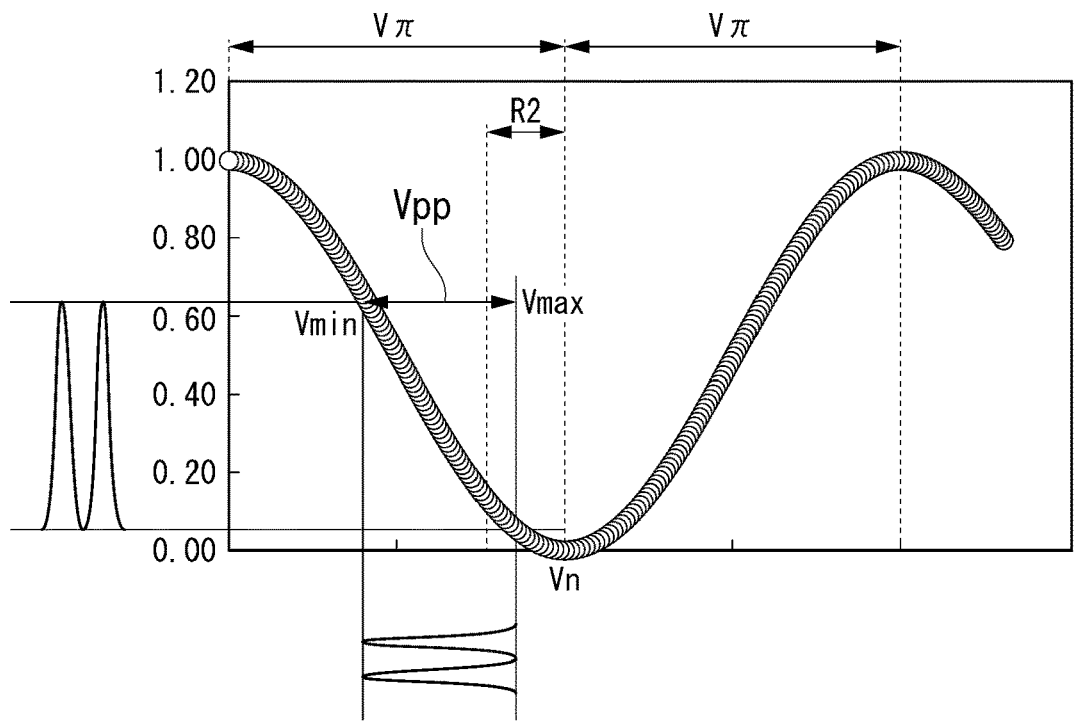
FIG. 8 is an explanatory view of a voltage width R2 of the optical modulator according to the first embodiment.

In addition, when the maximum value voltage Vmax of an applied voltage is the null point voltage Vn or smaller, the maximum value voltage Vmax is designed to satisfy the following Expression (2), as illustrated in FIG. 8.

$$Vn - 0.29 V\pi \leq V\max \leq Vn \qquad (2)$$

Optical modulation by the optical modulation element 100 will be described using FIG. 5. FIG. 5 is a view illustrating a relationship between an applied voltage and an output of the optical modulator 200 according to the first embodiment. In FIG. 5, the horizontal axis indicates a voltage applied to the optical modulation element 100, and the vertical axis indicates a standardized output from the optical modulation element 100. An output is standardized as "1" when the phase difference between light propagated through the first optical waveguide 11 and light propagated through the second optical waveguide 12 is zero.

Next, the null point voltage Vn and the half-wavelength voltage V$\pi$ will be described. The output of the optical modulation element 100 is maximized when the applied voltage is zero. This is because the phase difference between light propagated through the first optical waveguide 11 and light propagated through the second optical waveguide 12 is zero when the applied voltage is zero. As the applied voltage is increased, an output from the optical modulation element 100 gradually decreases and becomes extremely small at a certain point. The voltage at which an output from the optical modulation element 100 becomes extremely small is the null point voltage Vn. A half-wavelength voltage (half-wavelength phase modulation voltage) is a voltage for making the phase difference of light 1800 using a Mach-Zehnder-type optical modulator, and a voltage width in which an output from the optical modulation element 100 reaches the minimum from the maximum corresponding to the half-wavelength voltage V$\pi$. If a voltage exceeding the null point voltage Vn is applied, an output from the optical modulation element 100 periodically changes. An output from the optical modulation element 100 repeats the maximum and the minimum for each half-wavelength voltage V$\pi$.

The half-wavelength voltage V$\pi$ of the optical modulation element 100 changes depending on the constitution of the optical modulation element 100. The half-wavelength voltage Vπ changes depending on the length of the electrode 21 on the first optical waveguide 11 and the length of the electrode 22 on the second optical waveguide 12. The length is a length in a propagation direction of light. In the case of FIG. 3, it is a length of a part of the electrode 21 overlapping the first optical waveguide 11 or a length of a part of the electrode 22 overlapping the second optical waveguide 12. This length is referred to as an interaction length. If the interaction length is long, the half-wavelength voltage Vπ decreases, and if the interaction length is short, the half-wavelength voltage Vπ increases.

Since an optical modulation element using a lithium niobate thin film can efficiently apply an electric field to the optical waveguides compared to an optical modulation element using bulk lithium niobate, the half-wavelength voltage Vπ can be reduced. However, the optical modulation element 100 needs to be further miniaturized in order to be assembled in a transceiver for a data center, and the interaction length of the optical modulation element 100 needs to be shortened. In addition, the interaction length needs to be shortened in order to widen a modulation frequency band of the optical modulation element 100. Meanwhile, since the half-wavelength voltage Vπ increases by shortening the interaction length, the drive voltage (applied voltage width Vpp) needs to be set to 0.4 Vπ or lower.

The operating point voltage Vd may fluctuate due to a temperature or the like of a usage environment. When the operating point voltage Vd fluctuates while being used, the minimum value voltage Vmin and the maximum value voltage Vmax of the applied voltage width Vpp are corrected by the DC bias control circuit 130 to be in a range of voltage widths R1 and R2. For example, the DC bias control circuit 130 corrects fluctuation of the operating point on the basis of branch light $L_b$ which has branched from the output light $L_{out}$.

In addition, the drive circuit 110 also controls the applied voltage width Vpp applied to the optical modulation element 100. The drive circuit 110 controls a high-frequency voltage applied to the optical modulation element 100. The drive circuit 110 inputs an electrical signal, which is converted into an optical signal, to the optical modulation element 100. For example, the drive circuit 110 includes a power supply, a driver, and the like.

The drive circuit 110 controls the applied voltage width Vpp applied to the optical modulation element 100 in a range of 0.06×Vπ≤Vpp≤0.4×Vπ.

FIG. 6 is an explanatory view of the applied voltage width Vpp of the optical modulator 200 according to the first embodiment. FIG. 6 is a view illustrated by adding description of the applied voltage width Vpp to FIG. 5.

The applied voltage width Vpp is in a range of a voltage utilized when the optical modulation element 100 is operated. When the minimum value and the maximum value of an applied voltage are respectively set to the minimum value voltage Vmin and the maximum value voltage Vmax, the applied voltage width Vpp is expressed by Vmax-Vmin. A voltage within a predetermined range is applied to the optical modulation element 100 while having the operating point voltage Vd as the midpoint. A high-frequency voltage of the applied voltage width Vpp is applied to the optical modulation element 100. An output from the optical modulation element 100 changes in accordance with the range of Vmax and Vmin.

For example, when the minimum value voltage Vmin is Vn and the applied voltage width Vpp is the half-wavelength voltage Vπ, a voltage within a range of Vn to Vn+Vπ is normally applied to the optical modulation element 100. An output from the optical modulation element 100 is minimized when an applied voltage is Vn and is maximized when an applied voltage is Vn+Vπ. A variation width of an output of the optical modulation element 100 is maximized by changing an applied voltage between Vn and Vn+Vπ. Meanwhile, a drive voltage required to drive the optical modulation element 100 increases.

Figure 7:
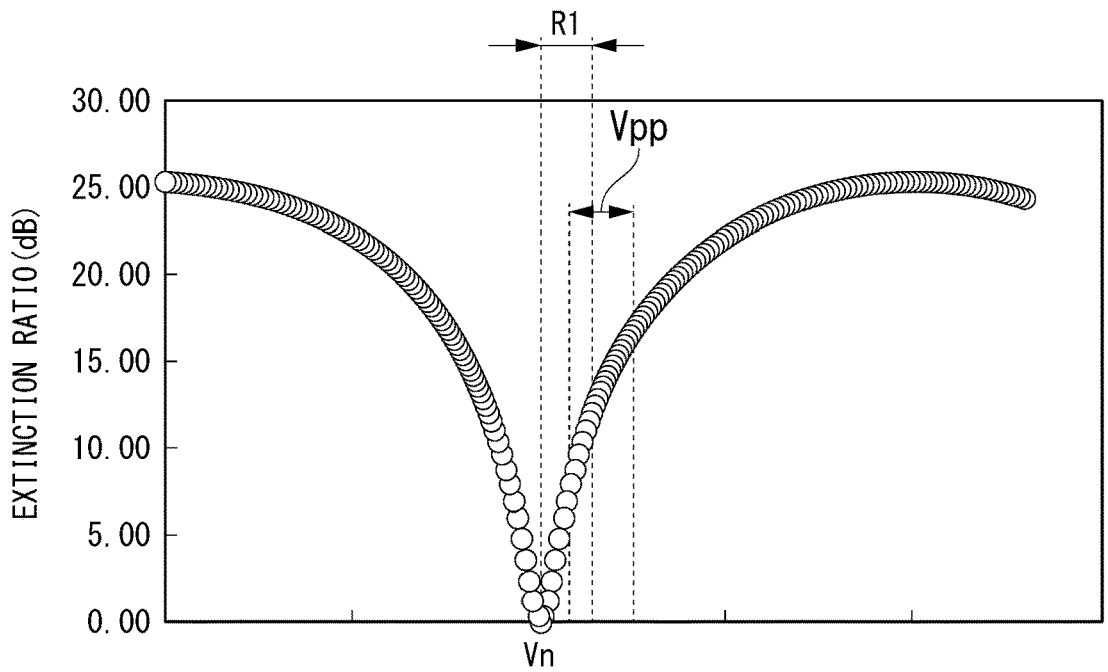
FIG. 7 is a view illustrating a relationship between an applied voltage and an extinction ratio of the optical modulator according to the first embodiment.

FIG. 7 is a view illustrating a relationship between an applied voltage and an extinction ratio of the optical modulator 200 according to the first embodiment. In FIG. 7, the horizontal axis indicates a voltage applied to the optical modulation element 100, and the vertical axis indicates a ratio of the output light $L_{out}$ at an applied voltage and the output light $L_{out}$ at a null point voltage. The extinction ratio is a ratio of the maximum value and the minimum value of the output light $L_{out}$ within a range of an applied voltage.

As illustrated in FIGS. 5 and 7, when the minimum value voltage Vmin is set within the voltage width R1, the optical modulation element 100 operates in a region in which the quantity of the output light $L_{out}$ is relatively small, but the relative extinction ratio with respect to the applied voltage width Vpp can be increased.

Here, as illustrated in FIG. 7, in a region in which the quantity of the output light $L_{out}$ of the optical modulation element 100 is sufficiently small (in the vicinity of the null point voltage Vn), change in extinction ratio is significant. An extinction ratio required for an optical modulator for a data center needs to be 3 dB or larger and is more preferably 6 dB or larger. A region having a large amount of change in extinction ratio can be utilized by setting the minimum value voltage Vmin within the voltage width R1, and a high extinction ratio can be obtained at a low drive voltage (0.4 Vπ or lower).

In addition, in the optical modulation element 100 using a lithium niobate film, if it is intended to maximize the extinction ratio, the drive voltage increases. However, it is possible to secure an extinction ratio of 3 dB or larger which can be used for a data center and to perform low-voltage driving (0.4 Vπ or lower) by setting the minimum value voltage Vmin within R1 and setting the applied voltage width Vpp in a range of 0.06×Vπ≤Vpp≤0.4×Vπ.

As described above, the optical modulator 200 according to the first embodiment can secure an extinction ratio of 3 dB or larger and perform low-voltage driving (0.4 Vπ or lower). The drive voltage is required to be 0.4×Vπ or lower, more preferably 0.35×Vπ or lower, further preferably 0.3×Vπ or lower, and most preferably 0.25×Vπ or lower. Further, it is preferable to set the operating point such that the extinction ratio shown in Table 1 becomes 6 dB or larger with a drive voltage of 0.4×Vπ or lower. Table 1 is a table showing a relationship among the minimum value voltage Vmin, the applied voltage width Vpp, and the extinction ratio. Both the minimum value voltage Vmin and the applied voltage width Vpp are values standardized by the half-wavelength voltage. In Table 1, the first column indicates the minimum value voltage (Vmin/Vπ), and the first row indicates Vpp/Vπ. In Table 1, the value of each cell indicates the extinction ratio (dB) when the minimum value voltage in the row where the cell belongs and Vpp in the column where the cell belongs are combined. For example, when the minimum value voltage (Vmin/Vπ) is 1.00 and Vpp/Vπ is 0.25, the extinction ratio is 16.7 dB.

For example, when the drive voltage is set to 0.4×Vπ, it is preferable to set the operating point Vd such that the minimum value voltage Vmin of the applied voltage width Vpp is within a range of Vn to Vn+0.29 Vπ. In addition, when the drive voltage is set to 0.35×Vπ, it is preferable to set the operating point Vd such that the minimum value voltage Vmin of the applied voltage width Vpp is within a range of Vn to Vn+0.27 Vπ. In addition, when the drive voltage is set to 0.3×Vπ, it is preferable to set the operating point Vd such that the minimum value voltage Vmin of the applied voltage width Vpp is within a range of Vn to Vn+0.24 Vπ. In addition, when the drive voltage is set to 0.25×Vπ, it is preferable to set the operating point Vd such that the minimum value voltage Vmin of the applied voltage width Vpp is within a range of Vn to Vn+0.21 Vπ.

TABLE 1

| Minimum value voltage | Vpp = 0.25 | Vpp = 0.30 | Vpp = 0.35 | Vpp = 0.40 |
|---|---|---|---|---|
| 1.00 | 16.7 | 18.2 | 19.4 | 20.4 |
| 1.01 | 16.7 | 18.1 | 19.3 | 20.3 |
| 1.02 | 16.2 | 17.5 | 18.7 | 19.6 |
| 1.03 | 15.3 | 16.6 | 17.7 | 18.6 |
| 1.04 | 14.4 | 15.7 | 16.7 | 17.6 |
| 1.05 | 13.5 | 14.7 | 15.7 | 16.6 |
| 1.06 | 12.7 | 13.8 | 14.8 | 15.6 |
| 1.07 | 11.9 | 13.0 | 14.0 | 14.8 |
| 1.08 | 11.2 | 12.3 | 13.2 | 14.0 |
| 1.09 | 10.6 | 11.6 | 12.5 | 13.3 |
| 1.10 | 10.0 | 11.0 | 11.9 | 12.6 |
| 1.11 | 9.5 | 10.5 | 11.3 | 12.0 |
| 1.12 | 9.0 | 10.0 | 10.8 | 11.5 |
| 1.13 | 8.6 | 9.5 | 10.3 | 10.9 |
| 1.14 | 8.2 | 9.1 | 9.8 | 10.5 |
| 1.15 | 7.8 | 8.7 | 9.4 | 10.0 |
| 1.16 | 7.5 | 8.3 | 9.0 | 9.6 |
| 1.17 | 7.2 | 8.0 | 8.7 | 9.2 |
| 1.18 | 6.9 | 7.7 | 8.3 | 8.9 |
| 1.19 | 6.6 | 7.4 | 8.0 | 8.6 |
| 1.20 | 6.3 | 7.1 | 7.7 | 8.2 |
| 1.21 | 6.1 | 6.8 | 7.4 | 7.9 |
| 1.22 | 5.9 | 6.6 | 7.2 | 7.7 |
| 1.23 | 5.7 | 6.3 | 6.9 | 7.4 |
| 1.24 | 5.5 | 6.1 | 6.7 | 7.1 |
| 1.25 | 5.3 | 5.9 | 6.4 | 6.9 |
| 1.26 | 5.1 | 5.7 | 6.2 | 6.7 |
| 1.27 | 4.9 | 5.5 | 6.0 | 6.4 |
| 1.28 | 4.7 | 5.3 | 5.8 | 6.2 |
| 1.29 | 4.6 | 5.1 | 5.6 | 6.0 |

Thus far, the optical modulator 200 according to the first embodiment has been described as an example, but the present invention is not limited to the first embodiment and various modifications can be made.

For example, the applied voltage width Vpp may be set to 0.06×Vπ≤Vpp≤0.35×Vπ. In this case, the extinction ratio of the optical modulator 200 can be set to 3 dB or larger at a smaller applied voltage.

In addition, for example, the applied voltage width Vpp may be set to 0.06×Vπ≤Vpp≤0.3×Vπ. In this case, the extinction ratio of the optical modulator 200 can be set to 3 dB or larger at a much smaller applied voltage than when the applied voltage width Vpp is set to 0.06×Vπ≤Vpp≤0.35×Vπ. More preferably, the applied voltage width Vpp is 0.06×Vπ≤Vpp≤0.25×Vπ.

When Vpp is set to 0.4×Vπ or lower, it is preferable to set the operating point voltage Vd such that the minimum value voltage Vmin of Vpp becomes Vn≤Vmin≤Vn+0.29×Vπ. When Vpp is set to 0.35×Vπ or lower, it is preferable to set the operating point voltage Vd such that the minimum value voltage Vmin becomes Vn≤Vmin≤Vn+0.27×Vπ. When Vpp is set to 0.3×Vπ or lower, it is preferable to set the operating point voltage Vd such that the minimum value voltage Vmin of Vpp becomes Vn≤Vmin≤Vn+0.24×Vπ. When Vpp is set to 0.25×Vπ or lower, it is preferable to set the operating point voltage Vd such that the minimum value voltage Vmin of Vpp becomes Vn≤Vmin≤Vn+0.21×Vπ.

In FIG. 6, the minimum value voltage Vmin of the applied voltage width Vpp is set in a range of the voltage width R1, but the maximum value voltage Vmax of the applied voltage width Vpp may be set in a range of the voltage width R2 as shown in FIG. 8. In this case, the voltage width R2 is defined by the half-wavelength voltage Vπ and the null point voltage Vn. Specifically, the voltage width R2 is a range of Vn−0.29×Vπ to Vn. That is, the maximum value voltage Vmax is designed to satisfy the foregoing Expression (2).

$$Vn-0.29\times V\pi \leq Vmax \leq Vn \quad (2)$$

The extinction ratio can be 3 dB or larger at an applied voltage with the applied voltage width Vpp in a range of 0.06×Vπ≤Vpp≤0.4×Vπ by setting Vmax a range of Vn−0.29×Vπ to Vn. Further, while the drive voltage is 0.4×Vπ or lower, it is more preferable to set the operating point such that the extinction ratio becomes 6 dB or larger.

For example, in a case of setting the voltage width R2 to a side smaller than the null point voltage Vn, when the drive voltage is set to 0.4×Vπ, it is preferable to set the operating point Vd such that the maximum value voltage Vmax of the applied voltage width Vpp is within a range of Vn to Vn−0.29 Vπ. In addition, when the drive voltage is set to 0.35×Vπ, it is preferable to set the operating point Vd such that the maximum value voltage Vmax of the applied voltage width Vpp is within a range of Vn to Vn−0.27 Vπ. In addition, when the drive voltage is set to 0.3×Vπ, it is preferable to set the operating point Vd such that the maximum value voltage Vmax of the applied voltage width Vpp is within a range of Vn to Vn−0.24×Vπ. In addition, when the drive voltage is set to 0.25×Vπ, it is preferable to set the operating point Vd such that the maximum value voltage Vmax of the applied voltage width Vpp is within a range of Vn to Vn−0.21 Vπ.

For example, the applied voltage width Vpp may be set to 0.06×Vπ≤Vpp≤0.35×Vπ. In this case, the extinction ratio of the optical modulator 200 can be set to 3 dB or larger at a smaller applied voltage.

In addition, for example, the applied voltage width Vpp may be set to 0.06×Vπ≤Vpp≤0.3×Vπ. In this case, the extinction ratio of the optical modulator 200 can be set to 3 dB or larger at a much smaller applied voltage than when the applied voltage width Vpp is set to 0.06×Vπ≤Vpp≤0.35×Vπ. The more preferable applied voltage width Vpp is 0.06×Vπ≤Vpp≤0.25×Vπ.

When Vpp is set to 0.4×Vπ or lower, it is preferable to set the operating point voltage Vd such that the maximum value voltage Vmax of Vpp becomes Vn−0.29×Vπ≤Vmaxb≤Vn. When Vpp is set to 0.35×Vπ or lower, it is preferable to set the operating point voltage Vd such that the maximum value voltage Vmax of Vpp becomes Vn−0.27×Vπ≤Vmax≤Vn. When Vpp is set to 0.3×Vπ or lower, it is preferable to set the operating point voltage Vd such that the maximum value voltage Vmax of Vpp becomes Vn−0.24×Vπ≤Vmax≤Vn. When Vpp is set to 0.25×Vπ or lower, it is preferable to set the operating point voltage Vd such that the maximum value voltage Vmax of Vpp becomes Vn−0.21×Vπ≤Vmax≤Vn.

In addition, in the foregoing form, the control unit controls the operating point voltage Vd of the optical modulation element 100 but may control the minimum value voltage Vmin or the maximum value voltage Vmax.

Figure 9:
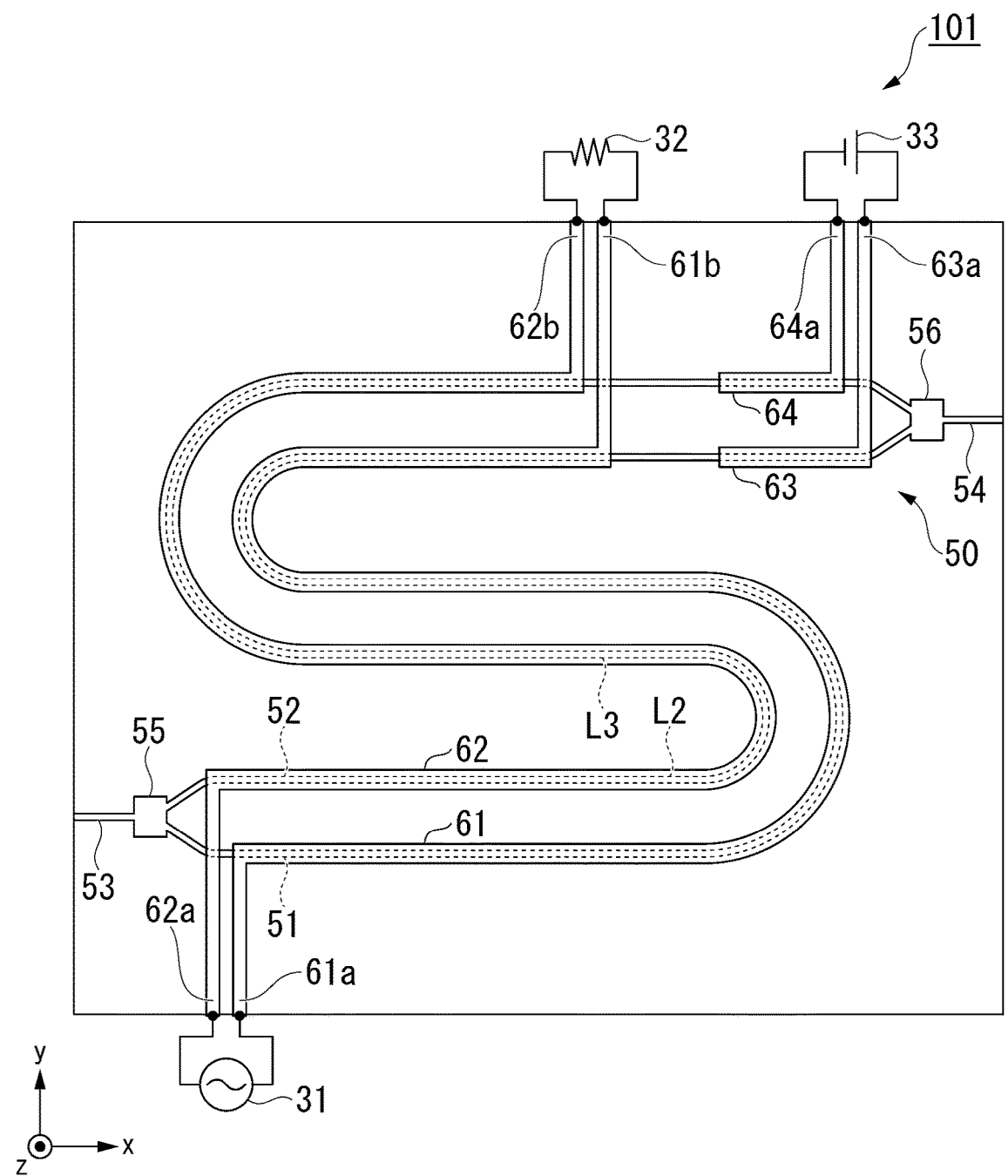
FIG. 9 is a plan view of an optical modulation element according to a first modification example.

As in FIG. 9, in an optical modulation element 101 according to the present embodiment, a first optical waveguide 51 and a second optical waveguide 52 may be curved. FIG. 9 is a plan view of the optical modulation element 101 according to a first modification in a plan view in the z direction. The optical modulation element 101 has an optical waveguide 50 and electrodes 61, 62, 63, and 64.

The optical waveguide 50 has the first optical waveguide 51, the second optical waveguide 52, an input path 53, an output path 54, a branch portion 55, and a coupling portion 56. The optical waveguide 50 differs from the optical waveguide 10 in that the first optical waveguide 51 and the second optical waveguide 52 are curved in the middle thereof. The optical waveguide 50 is otherwise similar to the optical waveguide 10.

The electrodes 61 and 62 are electrodes for applying the modulation voltage Vm to the optical waveguide 50. The electrode 61 is an example of the first electrode, and the electrode 62 is an example of the second electrode. A first end 61a of the electrode 61 is connected to the power supply 31, and a second end 61b is connected to the terminal resistor 32. A first end 62a of the electrode 62 is connected to the power supply 31, and a second end 62b is connected to the terminal resistor 32. The electrodes 63 and 64 are electrodes for applying the DC bias Vdc to the optical waveguide 50. A first end 63a of the electrode 63 and a first end 64a of the power supply 64 are connected to the power supply 33.

In FIG. 9, since the line widths and the line spacings of the electrode 61 and the electrode 62 disposed in a parallel manner are made wider, although the length of a part in which the electrode 61 and the first optical waveguide 51 overlap and the length of a part in which the electrode 62 and the second optical waveguide 52 overlap are illustrated such that they are different, the lengths thereof are substantially the same. Similarly, the length of a part in which the electrode 63 and the first optical waveguide 51 overlap and the length of a part in which the electrode 64 and the second optical waveguide 52 overlap are substantially the same.

The electrode 61 and the electrode 62 differ from the electrode 21 and the electrode 22 in that they are curved along the first optical waveguide 51 and the second optical waveguide 52. Each of the electrodes 61, 62, 63, and 64 is otherwise similar to each of the electrodes 21, 22, 23, and 24.

In the optical modulation element 101, since the first optical waveguide 51 and the second optical waveguide 52 are curved, the element size in the x direction is small. For example, the optical modulation element 101 can be realized to have an element size of 100 mm$^2$ or smaller and preferably 50 mm$^2$ or smaller. An optical modulator for a data center is required to be miniaturized. Since the optical waveguide 50 is curved, the optical modulation element 101 can also be accommodated in a small-sized region corresponding to an existing optical modulator for a data center.

REFERENCE SIGNS LIST 10, 50 Optical waveguide
11, 51 First optical waveguide
12, 52 Second optical waveguide
13, 53 Input path
14, 54 Output path
15, 55 Branch portion
16, 56 Coupling portion
21, 22, 23, 24, 61, 62, 63, 64 Electrode
30 Buffer layer
40 Oxide film
40a First surface
100, 101 Optical modulation element
110 Drive circuit
120 DC bias application circuit
130 DC bias control circuit
200 Optical modulator
$L_{in}$ Input light
$L_{out}$ Output light
$L_b$ Branch light
Vmin Minimum value voltage
Vmax Maximum value voltage
Vd Operating point voltage
Vn Null point voltage
Vπ Half-wavelength voltage
Vpp Applied voltage width

The invention claimed is:

1. An optical modulator comprising:
an optical modulation element having a first optical waveguide, a second optical waveguide, a first electrode configured to apply an electric field to the first optical waveguide, and a second electrode configured to apply an electric field to the second optical waveguide; and
a control unit configured to control an applied voltage between the first electrode and the second electrode,
wherein the control unit
sets Vpp to 0.06×Vπ≤Vpp≤0.4×Vπ when a half-wavelength voltage of the optical modulation element is Vπ and an applied voltage width that is an amplitude of the applied voltage applied to the optical modulation element is Vpp, and
sets Vn≤Vmin≤Vn+0.29×Vπ or Vn−0.29×Vπ≤Vmax≤Vn when a minimum value and a maximum value of a voltage applied to the optical modulation element are respectively Vmin and Vmax and a null point voltage of the optical modulation element is Vn,
wherein the optical modulation element is configured to have an extinction ratio of 3 dB or larger when being operated at a drive voltage lower than the half-wavelength voltage.

2. The optical modulator according to claim 1,
wherein the first optical waveguide and the second optical waveguide each include a ridge-shaped portion protruding from a first surface of a lithium niobate film.

3. A method comprising driving an optical modulation element having a first optical waveguide, a second optical waveguide, a first electrode at a position overlapping the first optical waveguide in a plan view, and a second electrode at a position overlapping the second optical waveguide in a plan view,
wherein Vpp is set to 0.06×Vπ≤Vpp≤0.4×Vπ when a half-wavelength voltage of the optical modulation element is Vπ and an applied voltage width that is an amplitude of the applied voltage applied to the optical modulation element is Vpp,
Vn≤Vmin≤Vn+0.29×Vπ or Vn−0.29×Vπ≤Vmax≤Vn is set when a minimum value and a maximum value of a voltage applied to the optical modulation element are respectively Vmin and Vmax and a null point voltage of the optical modulation element is Vn, and
the optical modulation element has an extinction ratio of 3 dB or larger while being driven at a drive voltage lower than the half-wavelength voltage.

4. The method for driving an optical modulation element according to claim 3, wherein the first optical waveguide and the second optical waveguide each include a ridge-shaped portion protruding from a first surface of a lithium niobate film.

\* \* \* \* \*